2,938,833
METHOD OF DETERMINING CARDIAC FUNCTION AND COMPOSITION THEREFOR

William G. M. Jones and Jeffrey M. Thorp, Manchester, England, assignors to Imperial Chemical Industries Limited, London, England, a corporation of Great Britain No Drawing. Filed Mar. 29, 1957, Ser. No. 649,285

Claims priority, application Great Britain Apr. 23, 1956

6 Claims. (Cl. 167—84.5)

This invention relates to new diagnostic compositions and more particularly it relates to new diagnostic compositions which are useful as cardiac output indicators.

According to the invention we provide new diagnostic compositions which are sterile aqueous solutions containing a dyestuff of the formula:

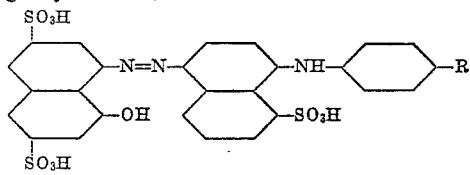

wherein R stands for hydrogen or for a methyl radical, in the form of a salt thereof.

Preferred compositions are those wherein for every 100 parts by weight of the said composition there is present between about 0.1 part by weight and about 10 parts by weight of the dyestuff of the above stated formula and more particularly, between about 0.5 part by weight and about 5 parts by weight of the said dyestuff.

As suitable salts of the above stated dyestuffs there may be mentioned for example the alkali metal salts for example the sodium salts.

The said new diagnostic compositions may optionally contain additional ingredients for example a bacteriostatic agent for example chlorocresol and/or ingredients which are known to be useful in the preparation of solutions which are isotonic with normal human plasma for example sodium chloride.

The dyestuff of the above stated formula may be obtained by coupling diazotised 1-amino-8-naphthol-3:6-disulphonic acid with phenyl- or p-tolyl-α-naphthylamine-8-sulphonic acid (The Society of Dyers and Colourists Colour Index, first edition, January 1924, Nos. 208 and 209 respectively), and thereafter purifying the product by known means for example by reprecipitation from aqueous solution with sodium acetate and washing the product so obtained with boiling ethanol. The dyestuff of the above stated formula wherein R stands for hydrogen has an absorption maximum at a wavelength of 590 millimicrons in aqueous solution in the presence of plasma.

As stated above, the diagnostic compositions of the invention are valuable for use as cardiac output indicators. They possess a low degree of toxicity and they do not cause pigmentation of the skin of patients following repeated administration. Moreover the dyestuff used in such compositions can readily be obtained in a high degree of purity as indicated by chromatographic analysis for example by passage through alumina.

The invention is illustrated but not limited by the following examples in which the parts are by weight:

Example 1

A solution of 0.5 part of the sodium salt of 3:6-disulpho - 8 - hydroxy - α - naphthalene - azo - phenyl - α-naphthylamine-8-sulphonic acid (Colour Index No. 208) in 100 parts of distilled water is sterilised by autoclaving at a pressure of 10 pounds per square inch during 30 minutes. There is thus obtained a sterile solution which is suitable for administration by intravenous injection in the determination of cardiac output.

The process as described above is repeated except that there is also added to the solution 0.77 part of sodium chloride and/or 0.2 part of chlorocresol. There are thus obtained in a similar manner, sterile solutions which are suitable for administration by intravenous injection in the determination of cardiac output.

Example 2

A solution of 1 part of the sodium salt of 3:6-disulpho - 8 - hydroxy - α - naphthalene - azo - phenyl - α-naphthylamine-8-sulphonic acid (Colour Index No. 208) in 100 parts of distilled water is sterilised by autoclaving at a pressure of 10 pounds per square inch during 30 minutes. There is thus obtained a sterile solution which is suitable for administration by intravenous injection in the determination of cardiac output.

The process as described above is repeated except that there is also added to the solution 0.65 part of sodium chloride and/or 0.2 part of chlorocresol. There are thus obtained, in a similar manner, sterile solutions which are suitable for administration by intravenous injection in the determination of cardiac output.

Example 3

A solution of 2 parts of the sodium salt of 3:6-disulpho - 8 - hydroxy - α - naphthalene - azo - phenyl-α-naphthylamine-8-sulphonic acid (Colour Index No. 208) in 100 parts of distilled water is sterilised by autoclaving at a pressure of 10 pounds per square inch during 30 minutes. There is thus obtained a sterile solution which is suitable for administration by intravenous injection in the determination of cardiac output.

The process as described above is repeated except that there is also added to the solution 0.4 part of sodium chloride and/or 0.2 part of chlorocresol. There are thus obtained, in a similar manner, sterile solutions which are suitable for administration by intravenous injection in the determination of cardiac output.

Example 4

A solution of 3.5 parts of the sodium salt of 3:6-disulpho - 8 - hydroxy - α - naphthalene - azo - phenyl-α-naphthylamine-8-sulphonic acid (Colour Index No. 208) in 100 parts of distilled water is sterilised by autoclaving at a pressure of 10 pounds per square inch during 30 minutes. There is thus obtained a sterile solution which is suitable for administration by intravenous injection in the determination of cardiac output.

The process as described above is repeated except that there is also added to the solution 0.2 part of chlorocresol. There is thus obtained, in a similar manner, a sterile solution which is suitable for administration by intravenous injection in the determination of cardiac output.

What we claim is:

1. The method of determining cardiac function which comprises injecting, as an indicator, a sterile aqueous solution containing a dyestuff of the formula:

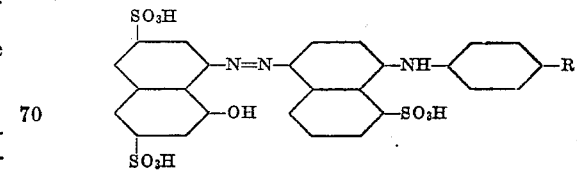

wherein R stands for a member of the group consisting of hydrogen and methyl, in the form of an alkali metal salt thereof.

2. The method of claim 1 wherein said indicator is the sodium salt of 3:6-disulpho-8-hydroxy-α-naphthalene-azo-phenyl-α-naphthylamine-8-sulphonic acid.

3. The method of claim 1 wherein said solution contains between 0.1 part by weight and 10 parts by weight of said dyestuff for every 100 parts by weight of said solution.

4. A diagnostic indicator composition for determining cardiac function comprising a dyestuff of the formula:

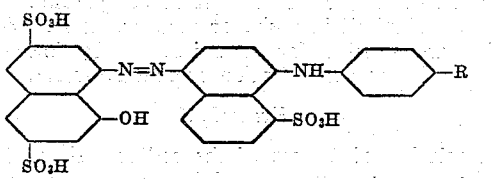

wherein R stands for a member of the group consisting of hydrogen and methyl, in the form of an alkali metal salt thereof in a sterile aqueous isotonic solution including sodium chloride and chlorocresol.

5. A composition according to claim 4 wherein said dyestuff is the sodium salt of 3:6-disulpho-8-hydroxy-α-naphthalene - azo - phenyl - α - naphthylamine - 8 - sulphonic acid.

6. A composition according to claim 4 containing from 0.1 to 10 parts by weight of said dyestuff per 100 parts by weight of said composition.

References Cited in the file of this patent

UNITED STATES PATENTS 611,664   Ulrich _____ Oct. 4, 1898

OTHER REFERENCES

Burger: Med. Chem., Intersci. Pub., N.Y., vol. 2, 1951, p. 846.

Am. J. Phys., vol. 177, pp. 134–137, 1954.